(12) United States Patent
Usui (10) Patent No.: US 7,522,429 B2
(45) Date of Patent: Apr. 21, 2009

(54) DC-DC CONVERTER

(75) Inventor: Hiroshi Usui, Sakado (JP)

(73) Assignee: Sanken Electric Co., Ltd., Saitama-Ken (JP)

(*) Notice: Subject to any disclaimer, the term of this patent is extended or adjusted under 35 U.S.C. 154(b) by 259 days.

(21) Appl. No.: 11/536,027

(22) Filed: Sep. 28, 2006

(65) Prior Publication Data

US 2007/0076448 A1   Apr. 5, 2007

(30) Foreign Application Priority Data

Sep. 30, 2005   (JP) .............................. 2005-286974

(51) Int. Cl.
*H02M 3/335* (2006.01)
(52) U.S. Cl. .......................................... 363/16; 363/30
(58) Field of Classification Search ............. 363/16–20, 363/21.04, 21.07, 21.12, 97, 131, 89, 21.16
See application file for complete search history.

(56) References Cited

FOREIGN PATENT DOCUMENTS

| JP | 2001224170 | 8/2001 |
|---|---|---|
| JP | 2003009528 | 1/2003 |
| JP | 2003018839 | 1/2003 |
| JP | 2003111404 | 4/2003 |
| JP | 2006129635 | 5/2006 |
| WO | 04001937 A1 | 12/2003 |
| WO | 2004019472 A1 | 3/2004 |
| WO | 2004036726 A1 | 4/2004 |

*Primary Examiner*—Rajnikant B Patel
(74) *Attorney, Agent, or Firm*—Wood, Herron & Evans, LLP (57) ABSTRACT

A DC-DC converter includes a transformer comprising primary and secondary coils. A series connection of the primary coil and a first switch is connected in parallel to a DC power. A series connection of a second switch and a capacitor is connected to both sides of the primary coil. A first control circuit controls an ON-time of the first switch. A second control circuit controls the second switch while the second control circuit is decoupled from the first control circuit. The first and second switches alternately turn ON and OFF. The second switch turns ON synchronizing with a first time period between after a charge to the capacitor is started and until the charge to the capacitor is ended. The second switch turns OFF when a second time period previously set has been elapsed after the second switch turned ON.

7 Claims, 7 Drawing Sheets

DC-DC CONVERTER

BACKGROUND OF THE INVENTION

1. Field of the Invention

The present invention generally relates to a DC-DC converter. More specifically, the present invention relates to an active clamp DC-DC converter.

Priority is claimed on Japanese Patent Application No. 2005-286974, filed Sep. 30, 2005, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Figure 7:
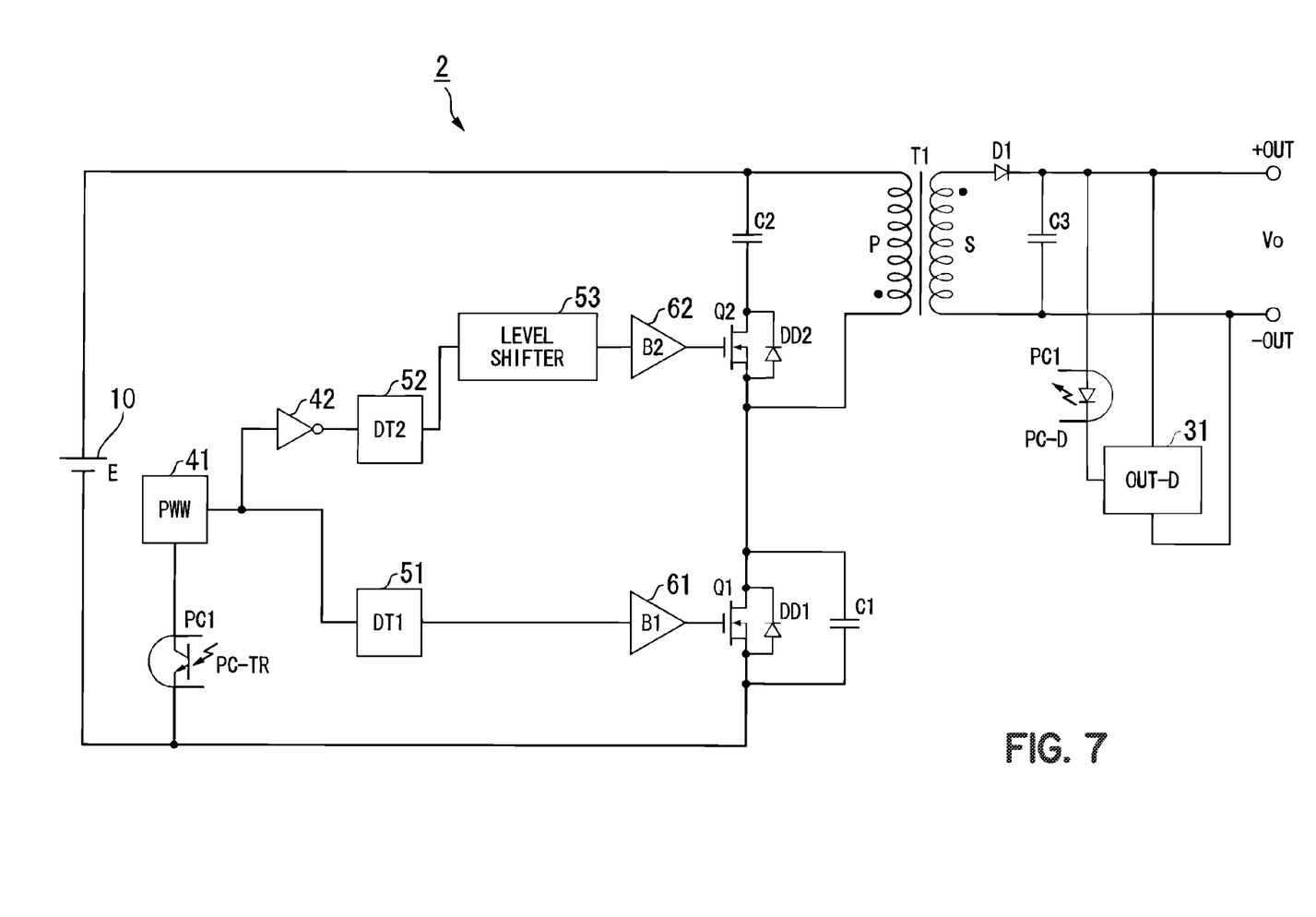
FIG. 7 is a circuit diagram illustrating the conventional active clamp DC-DC converter.

FIG. 7 is a circuit diagram illustrating a conventional active clamp DC-DC converter. The conventional active clamp DC-DC converter is configured to exhibit a partial current resonance and a voltage quasi resonance. A circuit configuration and operations of this conventional active clamp DC-DC converter have been known.

Japanese Unexamined Patent Application, First Publication, No. 2001-224170 discloses an example of the conventional active clamp DC-DC converter. Japanese Unexamined Patent Application, First Publication, No. 2003-9528 discloses another example of the conventional active clamp DC-DC converter.

As shown in FIG. 7, the conventional active clamp DC-DC converter has the following circuit configuration. A PWM signal generating circuit (PWM) 41 is configured to generate a PWM (Pulse Width Modulation) signal. A first dead-time adding circuit (DT1) 51 is configured to receive the PWM signal from the PWM signal generating circuit (PWM) 41. The first dead-time adding circuit (DT1) 51 is configured to add a dead time to the PWM signal to generate a first deal-time added PWM signal. The dead time is a period of time during which both first and second switching devices Q1 and Q2 remain OFF or are prevented from turning ON. The first deal-time added PWM signal is transmitted from the first dead-time adding circuit (DT1) 51 through a first buffer circuit 61 to the first switching device Q1 as a first driving signal. The first switching device Q1 includes a power MOSFET. The power MOSFET further includes a MOSFET and a parasitic diode.

An inverter circuit 42 is configured to receive the PWM signal from the PWM signal generating circuit (PWM) 41. The inverter circuit 42 is configured to invert the PWM signal to generate an inverted PWM. A second dead-time adding circuit (DT2) 52 is configured to receive the inverted PWM signal from the inverter circuit 42. The second dead-time adding circuit (DT2) 52 is configured to add a dead time to the inverted PWM signal to generate a second deal-time added PWM signal. A level shifter 53 is configured to receive the second deal-time added PWM signal from the second dead-time adding circuit (DT2) 52. The level shifter 53 is configured to shift a voltage level of the second deal-time added PWM signal to generate a second level-shifted deal-time added PWM signal. The second level-shifted deal-time added PWM signal is transmitted through a second buffer circuit 61 to the second switching device Q2 as a second driving signal. The second switching device Q2 includes a power MOSFET. The power MOSFET further includes a MOSFET and a parasitic diode. The first and second switching devices Q1 and Q2 turn OFF alternately with the dead time.

The first switching device Q1 turns ON while the second switching element Q2 remaining OFF thereby causing a current flow from a DC power supply 10 through a primary coil P of a transformer T1 to the DC power supply 10. Namely, a DC voltage E generated by the DC power supply 10 is applied to the primary coil P of the transformer T1, so that an excitation current with a triangle waveform flows through the primary coil P of the transformer T1, whereby an electromagnetic energy is accumulated in the transformer T1. An ON-time of the first switching device Q1 is decided by a feedback signal of a photo coupler PC1. The feedback signal is an error signal that is defined between a detected signal and a reference voltage. The reference voltage has previously been given. The detected signal is an output voltage Vo that appears on a secondary side S of the transformer T1. The detected signal is detected by an output voltage detecting circuit 31. The error signal is transmitted from the secondary side S of the transformer T1 to the primary side P thereof through the photo coupler PC1. The output voltage Vo on the secondary side S of the transformer T1 is kept constant. The photo coupler PC1 includes a light emitting diode (PC-D), and a light receiving transistor (PC-TR).

The first switching device Q1 turns OFF while the second switching device remaining OFF, thereby causing a current flow into a first capacitor C1 while no current flowing through the primary side P of the transformer T1.

A voltage across the first switching device Q1 has a quasi resonant waveform between the first capacitor C1 and a first inductance Lp of the primary side P of the transformer T1. When a voltage across the first capacitor C1 reaches the sum of the DC power voltage E and a voltage VC2 across a second capacitor C2, a part of the current that have flown into the capacitor C1 is caused to flow into a parasitic diode DD2 of the second switching device Q2, whereby both the first and second capacitors C1 and C2 are charged. The electromagnetic energy that has been accumulated in the transformer T1 is discharged from the secondary side S of the transformer TI through an output rectifier diode D1 and a smoothing capacitor C3 to an output side.

During which the current flows through the parasitic diode DD2 of the second switching device Q2, the dead time has ended and the second switching device Q2 turns ON, thereby allowing the second switching device Q2 to perform as a zero volt switch. The current flowing through the parasitic diode DD2 of the second switching device Q2 is reduced and the polarity thereof is inverted, whereby a current is caused to flow through the MOSFET of the second switching device Q2. This current that flows through the MOSFET of the second switching device Q2 is a resonant current between the inductance Lp of the primary side P of the transformer T1 and a sum of the first and second capacitors C1+C2, whereby a part of a sine waveform can be observed.

The second switching device Q2 turns OFF while the first switching device Q1 remaining OFF, whereby a voltage appears across the first switching device Q1, wherein the voltage has a quasi resonant waveform of the inductance Lp and the first capacitor C1. The capacitance of the circuit configuration is reduced from the sum of the first and second capacitors C1 and C2 into the capacitor C1, thereby rising a resonant frequency.

The voltage across the first capacitor C1 reaches the zero volt, thereby causing a current flow through a parasitic diode DD1 of the first switch Q1 while no current flowing into the first capacitor C1. The dead time ends during which the current flows through the parasitic diode DD1 thereby causing the first switching device Q1 to turn ON so as to allow the first switching device Q1 to perform as the zero volt switch.

The above operations of the circuit will be repeated.

The circuit configuration of the conventional DC-DC converter needs the voltage isolator or the level shifter that is configured to control both the first and second switching devices Q1 and Q2 synchronously with each other, provided that the first and second switching devices Q1 and Q2 are largely different in those driving voltage. Namely, as shown in FIG. 7, the level shifter 53 is provided to control both the first and second switching devices Q1 and Q2. In consideration of a commercial power of 200V, a 600V or higher voltage level shifter is needed. In another case, a pulse transformer can be used as the voltage isolator. The voltage isolator such as the pulse transformer is generally expensive, whereby the DC-DC converter is also expensive.

As described above, the conventional active clamp DC-DC converter shown in FIG. 7 is configured to exhibit the partial current resonance and the voltage quasi resonance. The conventional active clamp DC-DC converter needs the 600V or higher voltage level shifter to control or drive the first and second switching devices Q1 and Q2 that are different in driving voltage by 600V or higher provided that a 200V commercial power system is used. The pulse transformer can also be used as the voltage isolator. The voltage isolator such as the pulse transformer is generally expensive, whereby the DC-DC converter is also expensive.

In view of the above, it will be apparent to those skilled in the art from this disclosure that there exists a need for an improved active clamp DC-DC converter. This invention addresses this need in the art as well as other needs, which will become apparent to those skilled in the art from this disclosure.

SUMMARY OF THE INVENTION

Accordingly, it is a primary object of the present invention to provide an active clamp DC-DC converter with a reduced noise.

It is another object of the present invention to provide an active clamp DC-DC converter with a high efficiency.

It is a further object of the present invention to provide an active clamp DC-DC converter that does not need a voltage level shifter.

It is a still further object of the present invention to provide an active clamp DC-DC converter that does not need a voltage isolator.

It is yet a further object of the present invention to provide an active clamp DC-DC converter that is inexpensive.

In accordance with a first aspect of the present invention, a DC-DC converter may include, but is not limited to, a DC power supply, a first switching device, a transformer, a capacitor, a second switching device, a rectifying and smoothing circuit, and first and second control circuits. The transformer may further include, but is not limited to, a primary coil and a secondary coil. The primary coil is connected in series to the first switching device. The series connection of the primary coil and the first switching device are connected in parallel to the DC power supply. The second switching device is connected in series to the capacitor so that the series connection of the second switching device and the capacitor is connected to both sides of the primary coil. The rectifying and smoothing circuit is connected to both sides of the secondary coil. The rectifying and smoothing circuit generates a DC output. The first control circuit is connected to the first switching device. The first control circuit is configured to control the first switching device. The first control circuit is configured to control an ON-time of the first switching device. The second control circuit is connected to the second switching device. The second control circuit is configured to control the second switching device while the second control circuit is decoupled from the first control circuit. The first and second control circuits are configured to cause the first and second switching devices to alternately turn ON and OFF. The second control circuit is configured to cause the second switching device to turn ON synchronizing with when a charge to the capacitor is started or when the charge to the capacitor is ended. The second control circuit is configured to cause the second switching device to turn OFF when a second time period previously set has been elapsed after the second switching device turned ON.

After the first switching device turns OFF, the current that has previously flown through the primary coil of the transformer is caused to flow through the parasitic diode of the second switching device to charge the capacitor that is connected in series to the second switching device. The second switching device turns ON synchronizing with a time period between after the application of the charge current to the capacitor is started and until the application of the charge current to the capacitor is ended. The second switching device performs as a zero volt switch. The second switching device turns OFF when a predetermined time period has been lapsed after the second switching device turned ON. The second time period can be measured using a timer. Preferably, the second time period can be varied in proportional to a peak value of a charge current to the capacitor or proportional to the predetermined time period of applying the charge current to the capacitor.

The above-described circuit configuration allows the second switching device to perform as a zero volt switch, thereby reducing a noise of the DC-DC converter and providing an improved efficiency. The second control circuit is configured to control the second switching device while the second control circuit is decoupled from the first control circuit. This configuration does not need any pulse transformer or a level shifter that are expensive.

Preferably, the second control circuit can further be configured to vary the second time period in proportional to a peak value of a charge current to the capacitor. The second time period has previously been set. The second switching device turns OFF when a predetermined time period has been lapsed after the second switching device turned ON. The time period can be measured using a timer. Preferably, the time period can be varied in proportional to a peak value of a charge current to the capacitor so that an ON-time of the second switching device can automatically be controlled depending upon the operating state of the DC-DC converter. The second control circuit is configured to control the second switching device while the second control circuit is decoupled from the first control circuit. The DC-DC converter does not need any pulse transformer or a level shifter that are expensive.

Preferably, the second control circuit is further configured to vary the second time period in proportional to a time duration of applying a charge current to the capacitor. The second time period has previously been set. The second switching device turns OFF when a predetermined time period has been lapsed after the second switching device turned ON. The time period can be measured using a timer. Preferably, the time period can be varied in proportional to a time duration of applying a charge current to the capacitor so that an ON-time of the second switching device can automatically be controlled depending upon the operating state of the DC-DC converter. The second control circuit is configured to control the second switching device while the second control circuit is decoupled from the first control circuit. The DC-DC converter does not need any pulse transformer or a level shifter that are expensive.

Preferably, the transformer may further include an auxiliary coil. The first control circuit can be configured to detect a change in polarity of a voltage appearing at the auxiliary coil after the second switching device has turned OFF. The first control circuit can be configured to cause the first switching device to turn ON synchronizing with the detection of the change in polarity of the voltage.

The transformer has the auxiliary coil. The first control circuit can be configured to detect the inversion in polarity of the voltage appearing at the auxiliary coil of the transformer. The first control circuit can also be configured to apply a first driving signal to the first switching device so as to allow the first switching device to perform as a zero volt switch.

In accordance with a second aspect of the present invention, a DC-DC converter may include, but is not limited to, a DC power supply, a transformer, a first switching device, a first fly-wheel diode, a first capacitor, a second capacitor, a second switching device, a second fly-wheel diode, a rectifying and smoothing circuit, a first control circuit, a first control circuit, and a second control circuit. The transformer may further comprise a primary coil, a secondary coil and an auxiliary coil. The first switching device is connected between the DC power supply and the primary coil. The first fly-wheel diode is connected in parallel to the first switching device. The first capacitor is connected in parallel to the first switching device. The second capacitor is connected in series to the primary coil. The second switching device is connected in series to the second capacitor. The series connection of the second switching device and the second capacitor is connected between both sides of the primary coil. The second fly-wheel diode is connected in parallel to the second switching device. The rectifying and smoothing circuit is connected to both sides of the secondary coil. The rectifying and smoothing circuit is configured to generate a DC output. The first control circuit is connected to the first switching device. The first control circuit is configured to control the first switching device. The first control circuit is configured to control an ON-time of the first switching device. The second control circuit is connected to the second switching device. The second control circuit is configured to control the second switching device while the second control circuit is decoupled from the first control circuit. The first and second control circuits being configured to cause the first and second switching devices to alternately turn ON and OFF, the second control circuit being configured to cause the second switching device to turn ON synchronizing with when a charge to the second capacitor through the second fly-wheel diode is started or when the charge to the second capacitor through the second fly-wheel diode is ended, the second control circuit being configured to cause the second switching device to turn OFF when a second time period previously set has been elapsed after the second switching device turned ON, the first control circuit being configured to detect a change in polarity of a voltage appearing at the auxiliary coil after the second switching device has turned OFF, the first control circuit being configured to cause the first switching device to turn ON synchronizing with the detection of the change in polarity of the voltage.

After the first switching device turns OFF, the current that has previously flown through the primary coil of the transformer is caused to flow to charge the first capacitor and then further flow through the parasitic diode of the second switching device to charge the second capacitor that is connected in series to the second switching device. The second switching device turns ON synchronizing with when the application of the charge current to the capacitor is started or when the application of the charge current to the capacitor is ended. The second switching device performs as a zero volt switch. The second switching device turns OFF when a predetermined time period has been lapsed after the second switching device turned ON. The second time period can be measured using a timer. Preferably, the second time period can be varied in proportional to a peak value of a charge current to the capacitor or proportional to the predetermined time period of applying the charge current through the fly-wheel diode to the capacitor. The transformer has the auxiliary coil. The first control circuit can be configured to detect the inversion in polarity of the voltage appearing at the auxiliary coil of the transformer, and apply the first driving signal to the first switching device so that the first switching device turns ON.

The above-described circuit configuration allows the first and second switching devices to perform as zero volt switches, thereby reducing a noise of the DC-DC converter and providing an improved efficiency. The second control circuit is configured to control the second switching device while the second control circuit is decoupled from the first control circuit. This configuration does not need any pulse transformer or a level shifter that are expensive.

Preferably, the second control circuit can further be configured to vary the second time period in proportional to a peak value of a charge current to the capacitor. The second time period has previously been set. The second switching device turns OFF when a predetermined time period has been lapsed after the second switching device turned ON. The time period can be measured using a timer. Preferably, the time period can be varied in proportional to a peak value of a charge current to the capacitor so that an ON-time of the second switching device can automatically be controlled depending upon the operating state of the DC-DC converter. The second control circuit is configured to control the second switching device while the second control circuit is decoupled from the first control circuit. The DC-DC converter does not need any pulse transformer or a level shifter that are expensive.

Preferably, the second control circuit is further configured to vary the second time period in proportional to a time duration of applying a charge current to the capacitor. The second time period has previously been set. The second switching device turns OFF when a predetermined time period has been lapsed after the second switching device turned ON. The time period can be measured using a timer. Preferably, the time period can be varied in proportional to a time duration of applying a charge current to the capacitor so that an ON-time of the second switching device can automatically be controlled depending upon the operating state of the DC-DC converter. The second control circuit is configured to control the second switching device while the second control circuit is decoupled from the first control circuit. The DC-DC converter does not need any pulse transformer or a level shifter that are expensive.

The circuit configuration of the DC-DC converter is configured to allow the switching device to perform as zero-volt switch, thereby reducing a noise of the DC-DC converter of the active clamp type and also improving the DC-DC conversion efficiency. The second control circuit is configured to control the second switching device for active clamp of the voltage quasi resonant DC-DC converter while the second control circuit is decoupled from the first switching device, thereby allowing the DC-DC converter to be free of any pulse transformer or level shifter that may be expensive.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

FIRST EMBODIMENT

Figure 1:
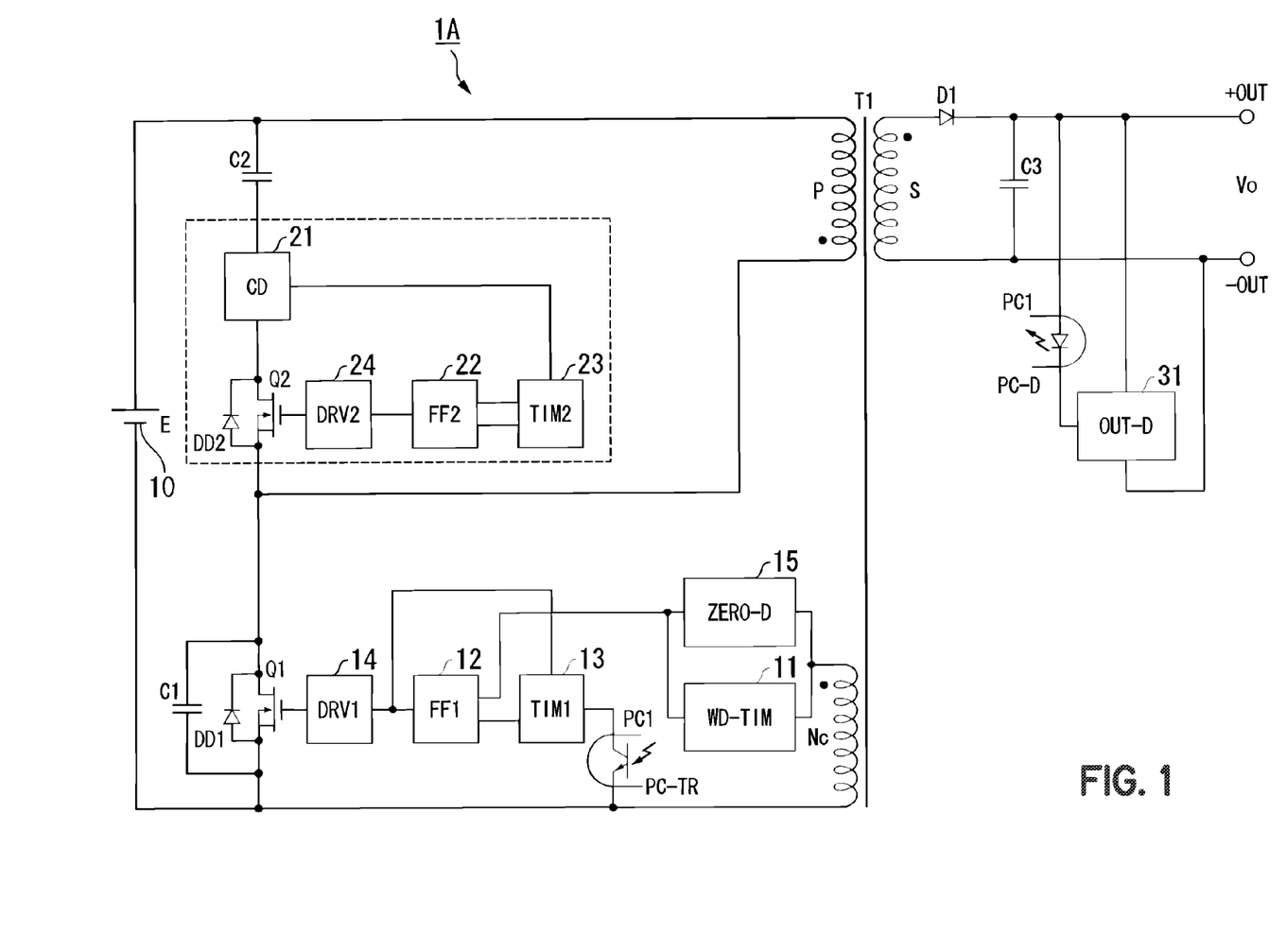
FIG. 1 is a circuit diagram illustrating a DC-DC converter in accordance with a first embodiment of the present invention.

FIG. 1 is a circuit diagram illustrating a DC-DC converter in accordance with a first embodiment of the present invention. A DC-DC converter 1A includes a high voltage control circuit and a low voltage control circuit. The low voltage control circuit can be realized by a control circuit for quasi resonation of a general quasi resonating fly-back converter.

A DC-DC converter 1A is configured as shown in FIG. 1. The DC-DC converter 1A includes a DC power supply 10 that is configured to generate a DC-power voltage E. The DC-DC converter 1A also includes a transformer T1 that has a primary coil P, a secondary coil S and a ternary coil Nc. The primary coil P is electrically connected to a high voltage side of the DC power supply 10. The ternary coil Nc is electrically connected to a low voltage side of the DC power supply 10. The DC-DC converter 1A also includes a first switching device Q1 that is electrically connected in series to the low voltage side of the DC power supply 10. The DC-DC converter 1A also includes a second switching device Q2 that is electrically connected in series to the first switching device Q1. The DC-DC converter 1A also includes a first capacitor C1 that is connected in parallel to the first switching device Q1 and between the low voltage side of the DC power supply 10 and the second switching device Q2. The first switching device Q1 further includes a parasitic diode DD1. The second switching device Q2 further includes a parasitic diode DD2.

The DC-DC converter 1A also includes a current detecting circuit (CD) 21 that is electrically connected to the second switching device Q2. The DC-DC converter 1A also includes a second capacitor C2 that is electrically connected between the current detecting circuit (CD) 21 and the high voltage side of the DC power supply 10. The current detecting circuit (CD) 21 is configured to detect that the current flow is caused through the parasitic diode DD2 of the second switching device Q2.

The DC-DC converter 1A also includes a first driver circuit (DRV1) 14 that has an output being electrically connected to a control terminal of the first switching device Q1. The first driver circuit (DRV1) 14 is also configured to apply a first driving signal to the control terminal of the first switching device Q1 so as to control switching operations of the first switching device Q1. The DC-DC converter 1A also includes a second driver circuit (DRV2) 24 that has an output being electrically connected to a control terminal of the second switching device Q2. The second driver circuit (DRV2) 24 is also configured to apply a second driving signal to the control terminal of the second switching device Q2 so as to control switching operations of the second switching device Q2.

The DC-DC converter 1A also includes a first flip-flop circuit (FF1) 12 that has an output electrically connected to an input of the first driver circuit (DRV1) 14. The DC-DC converter 1A also includes a second flip-flop circuit (FF2) 22 that has an output electrically connected to an input of the second driver circuit (DRV2) 24. The DC-DC converter 1A also includes a first timer circuit (TIM1) 13 that has an output electrically connected to a first input of the first flip-flop circuit (FF1) 12. The first timer circuit (TIM1) 13 has an input electrically connected to the output of the first flip-flop circuit (FF1) 12. The DC-DC converter 1A also includes a second timer circuit (TIM2) 23 that has first and second outputs electrically connected to first and second inputs of the second flip-flop circuit (FF2) 22. The second timer circuit (TIM2) 23 has an input electrically connected to an output of the current detecting circuit (CD) 21.

The DC-DC converter 1A also includes a zero detecting circuit 15 that is electrically connected to the ternary coil Nc of the transformer T1 so as to detect a voltage that is generated at the ternary coil Nc of the transformer T1. Namely, the zero detecting circuit 15 is configured to detect the polarity inversion of the voltage appearing at the ternary coil Nc of the transformer T1. In other words, the zero detecting circuit 15 is configured to detect that the voltage appearing at the ternary coil Nc of the transformer T1 becomes zero. The zero detecting circuit 15 has an output electrically connected to a second input of the first flip-flop circuit (FF1) 12.

The DC-DC converter 1A also includes a switch dog timer (WD-TIM) 11 that has an input electrically connected to the ternary coil Nc of the transformer 11. The switch dog timer 11 also has an output electrically connected to a second input of the first flip-flop circuit (FF2) 12.

The DC-DC converter 1A also includes first and second output terminals +OUT and −OUT which are connected to both sides of the secondary coil S. The DC-DC converter 1A also includes a third capacitor C3 which is electrically connected between the first and second output terminals +OUT and −OUT. The DC-DC converter 1A also includes a diode D1 that is electrically connected between the secondary coil S of the transformer T1 and the first output terminal +OUT. The DC-DC converter 1A also includes an output voltage detecting circuit 31 that is electrically connected to the first and second output terminals +OUT and −OUT. The output voltage detecting circuit 31 is configured to detect an output voltage between the first and second output terminals +OUT and −OUT.

The DC-DC converter 1A also includes a photo-coupler PC1 that further includes a light emitting diode (PC-D) and a light receiving diode (PC-TR). The light emitting diode (PC-D) is electrically connected between the first output terminal +OUT and the output voltage detecting circuit 31. The light receiving diode (PC-TR) is electrically connected between the first timer circuit (TIM) 13 and the low voltage side of the DC power supply 10.

The series connection of the second capacitor C2, the current detection circuit (CD) 21 and the second switching device Q2 is electrically connected in parallel to the primary coil P of the transformer T1.

Figure 2:
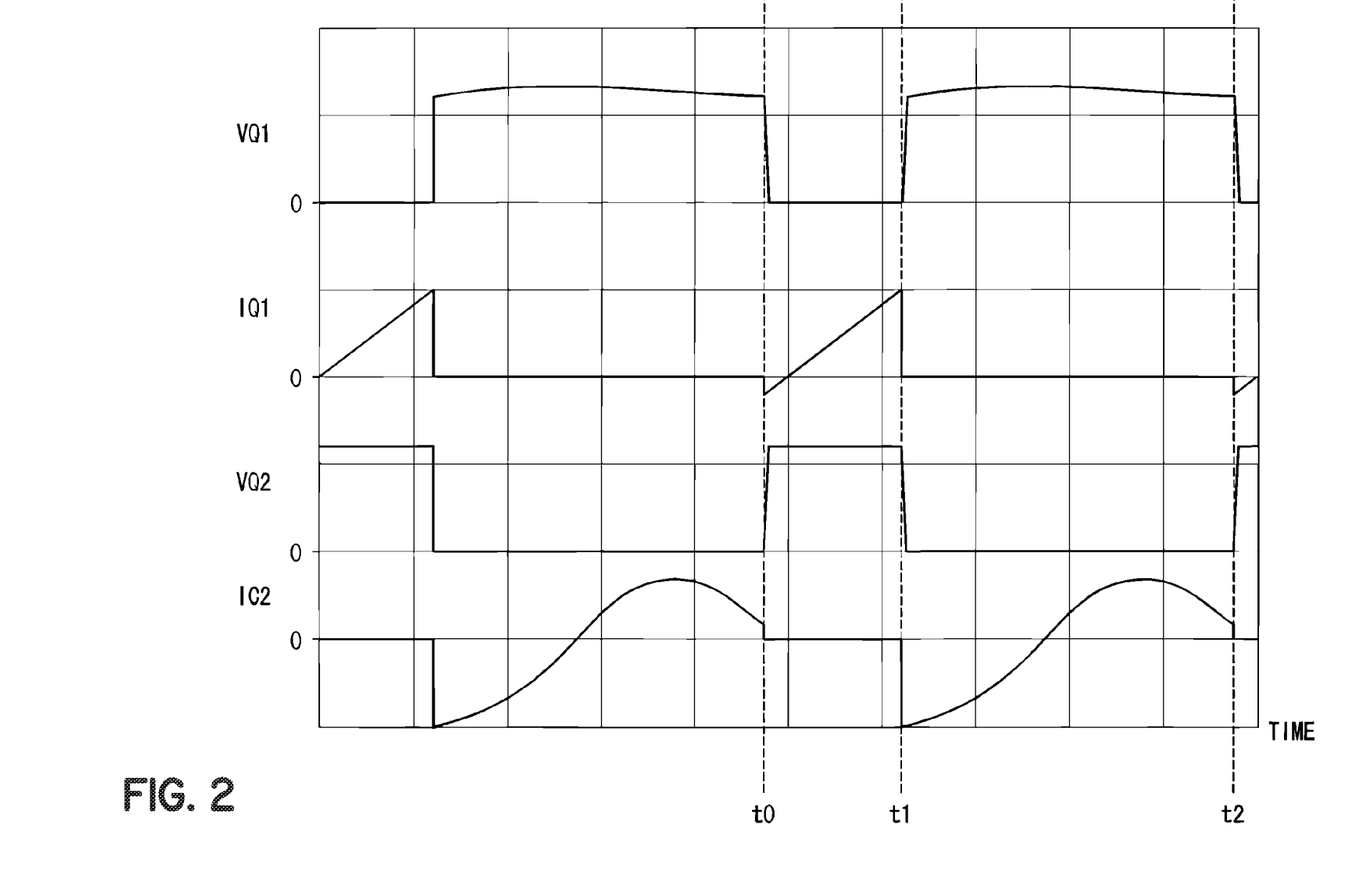
FIG. 2 is a diagram illustrating waveforms of first and second driving voltages and currents VQ1, IQ1, VQ2 and IQ2 applied to the first and second switching devices Q1 and Q2 of the DC-DC converter shown in FIG. 1.

Operations of the above-described DC-DC converter will be described. FIG. 2 is a diagram illustrating waveforms of first and second driving voltages and currents VQ1, IQ1, VQ2 and IQ2 applied to the first and second switching devices Q1 and Q2 of the DC-DC converter shown in FIG. 1.

After the power turns ON, the switch dog timer 11 sets the first flip-flop (FF1) 12, wherein the output of the first flip-flop (FF1) 12 is set at H-level (high level), whereby the first timer circuit 13 is operated while the first driver circuit (DRV1) 14 amplifies the H-level signal to generate a first driving signal for driving the first switching device Q1.

Input of the first driving signal into the first switching device Q1 causes a current flow from the DC power supply 10 through the primary coil P of the transformer T1 and the first switching device Q1 to the DC power supply 10. Namely, the DC voltage E generated by the DC power supply 10 is applied to the primary coil P of the transformer T1 whereby an excitation current with a triangular waveform flows through the transformer T1 and an magnetic energy is accumulated in the transformer T1.

The first switching device Q1 has a first ON-time that is equal to a first time period set by the first timer circuit (TIM1) 13, wherein the first time period is decided by a feedback signal of the photo-coupler PC1. The feedback signal of the photo-coupler PC1 is an error signal that is obtained by comparing a detected signal with reference to a reference signal. The reference signal has previously been given. The detected signal is an output voltage Vo at the secondary coil S of the transformer T1 that has been detected by the output voltage detecting circuit 31. The feedback signal is transmitted through the photo-coupler PC1 and the secondary coil S to the primary coil P thereby controlling the first ON-time of the first switching device Q1 while keeping the output voltage Vo constant in the secondary side. The photo-coupler PC1 includes a light emitting diode (PC-D) and a light receiving diode (PC-TR).

After the timer time period has elapsed, the first timer circuit (TIM1) 3 supplies the H-level signal to the first flip-flop circuit (FF1) 12 thereby re-setting the first flip-flop circuit (FF1) 12 whereby the first flip flop circuit (FF1) 12 to output the L-level (low level). The first driver circuit (DRV1) also outputs the L-level (low level) which is supplied to the first switching device Q1, whereby the first switching device Q1 turns OFF.

After the first switching device Q1 turns OFF, the current flows into the first capacitor C1 while no current flows through the primary coil P of the transformer T1. A voltage across the first switching device Q1 has a voltage quasi resonant waveform between the first capacitor C1 and the inductance Lp of the primary coil P of the transformer T1. The voltage across the first capacitor C1 reaches the sum of the DC power voltage E and the voltage VC2 of the second capacitor C2, thereby continuing the current flow into the first capacitor C1 while causing a current flow through the parasitic diode DD2 of the second switching device Q2 to the second capacitor C2. Namely, both the first and second capacitors C1 and C2 are charged. At the same time, the magnetic energy that has been accumulated is discharged from the secondary coil S of the transformer T1 through the rectifying diode D1 and the smoothing capacitor C3 to the output terminals +OUT and −OUT.

The current detecting circuit (CD) 21 detects that the current flow is caused through the parasitic diode DD2 of the second switching device Q2. The second flip-flop (FF2) 22 is set synchronizing with a period of time from the current detection to a polarity inversion of the current, namely the termination of the current flow through the parasitic diode of the second switching device Q2. The second driver circuit (DRV2) 24 causes the first switching device Q1 to turn ON, thereby allowing the first switching device Q1 to perform as the zero volt switch.

After the second switching device Q2 has turned ON, the current flowing through the parasitic diode DD2 of the second switching device Q2 is reduced and then the polarity of the current is inverted thereby causing a current flow through the MOSFET of the second switching device Q2. If no current flows through the parasitic diode DD2 of the second switching device Q2, then a current flows through the MOSFET of the second switching device Q2. This current has an inverted polarity from the current that has previously flown through the parasitic diode DD2 of the second switching device Q2.

This current is a resonant current between the inductance Lp of the primary coil P and the sum of the first and second capacitors (C1+C2). Thus, a part of the sine waveform can be observed. When the second switching device Q2 turns ON, the second timer circuit (TIM2) 23 starts the timing operation. After a predetermined target time period has lapsed, the second timer circuit (TIM2) 23 supplies a reset signal to the second flip-flop (FF2) 22. The second flip-flop (FF2) 22 supplies an output signal to the second driver circuit (DRV2) 24. The second driver circuit (DRV2) 24 supplies the second driving signal to the second switching device Q2, whereby the second switching device Q2 turns OFF. This target timer time-period can preferably be either a constant time period, a time period that is proportional to a time period during which the current flows through the parasitic diode of the second switching device Q2, or a time period that is proportional to a peak value of the current flowing through the parasitic diode of the second switching device Q2.

After the second switching device Q2 turns OFF, the voltage across the first switching device Q1 has a voltage quasi resonant waveform between the inductance Lp of the primary coil P and the first capacitor C1. After the second switching device Q2 turns OFF, only the first capacitor C1 performs as a capacitor while the second capacitor C2 does not perform as a capacitor, whereby a resonant frequency is increased. When the voltage across the first capacitor C1 reaches zero volt, the resonant current that has previously flown through the first capacitor C1 is caused to flow through the parasitic diode DD1 of the first switching device Q1.

The ON-timing of the first switching device Q1 is decided by the zero detecting circuit 15 which detects a voltage generated at the ternary coil Nc of the transformer T1. Namely, the zero detecting circuit 15 detects the polarity inversion of the voltage that has been generated at the ternary coil Nc of the transformer T1, thereby setting the first flip-flop (FF1) 12. The first flip-flop (FF1) 12 supplies the output signal to the first driver circuit (DRV1) 14. The first driver circuit (DRV1) 14 supplies the first driving signal to the first switching device Q1.

The zero detecting circuit 15 detects that the voltage at the ternary coil Nc becomes zero, thereby setting the flip-flop (FF1) 12 with some time delay. The first switching device Q1 turns ON in the time period during which a current flows through the parasitic diode DD1 of the first switching device Q1 after the voltage across the first switching device Q1 has become zero. The first switching device Q1 performs as the zero volt switch.

The above-described operations will be repeated.

As described above, the DC-DC converter is configured to generate the current resonance and he voltage quasi resonant waveform without using any pulse transformer or level shifter. The DC-DC converter is reduced in noise. The DC-DC converter has a high efficiency. The DC-DC converter is inexpensive.

SECOND EMBODIMENT

Figure 3:
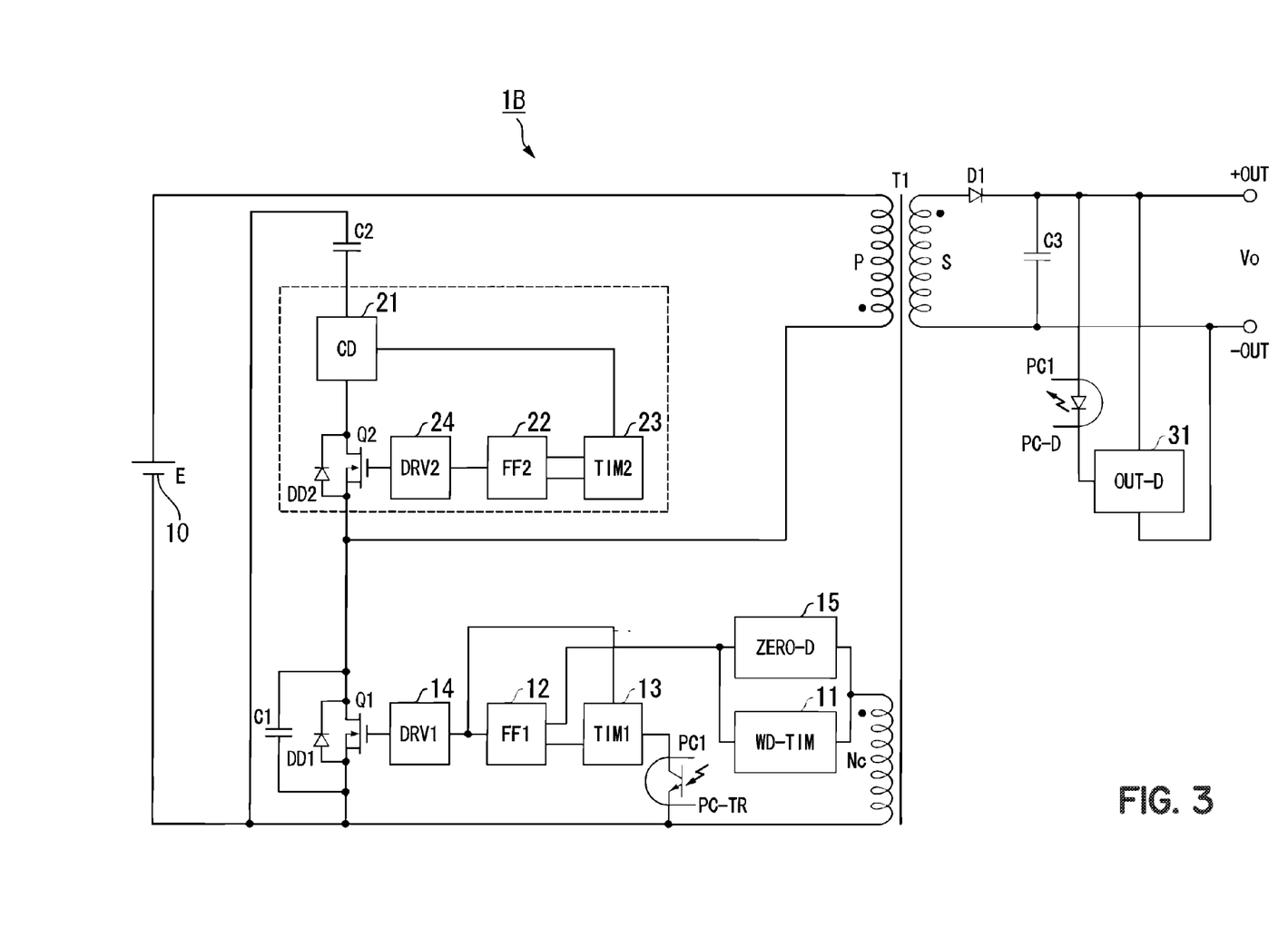
FIG. 3 is a circuit diagram illustrating a DC-DC converter in accordance with a second embodiment of the present invention.

FIG. 3 is a circuit diagram illustrating a DC-DC converter in accordance with a second embodiment of the present invention. A DC-DC converter 1B shown in FIG. 3 is different in circuit configuration from the above-described DC-DC converter 1A shown in FIG. 1. The following descriptions will focus on a difference between the DC-DC converter 1B shown in FIG. 3 and the above-described DC-DC converter 1A shown in FIG. 1.

In accordance with the above-described first embodiment, as shown in FIG. 1, the series connection of the second capacitor C2, the current detection circuit (CD) 21 and the second switching device Q2 is electrically connected in parallel to the primary coil P of the transformer T1. In accordance with the second embodiment, as shown in FIG. 3, the series connection of the second capacitor C2, the current detection circuit (CD) 21 and the second switching device Q2 is electrically connected in series to another series connection of the DC power supply 10 and the ternary coil Nc of the transformer T1.

The first modified circuit configuration of the DC-DC converter 1B shown in FIG. 3 provides substantially the same effects and advantages as those of the DC-DC converter 1A shown in FIG. 1.

THIRD EMBODIMENT

Figure 4:
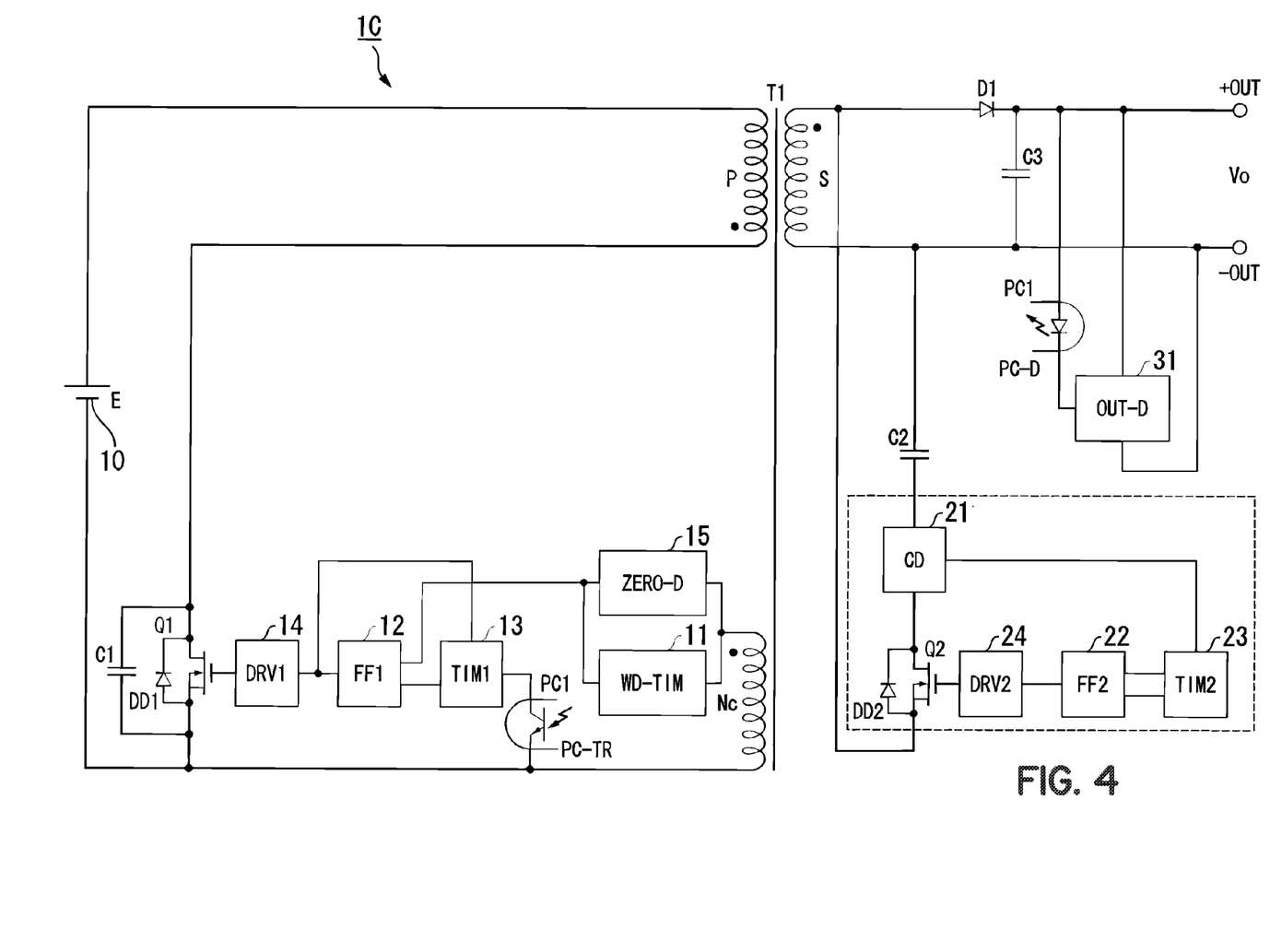
FIG. 4 is a circuit diagram illustrating a DC-DC converter in accordance with a third embodiment of the present invention.

FIG. 4 is a circuit diagram illustrating a DC-DC converter in accordance with a third embodiment of the present invention. A DC-DC converter 1C shown in FIG. 4 is different in circuit configuration from the above-described DC-DC converter 1A shown in FIG. 1. The following descriptions will focus on a difference between the DC-DC converter 1C shown in FIG. 4 and the above-described DC-DC converter 1A shown in FIG 1.

In accordance with the above-described first embodiment, as shown in FIG. 1, the series connection of the second capacitor C2, the current detection circuit (CD) 21 and the second switching device Q2 is electrically connected in parallel to the primary coil P of the transformer T1. In accordance with the third embodiment, as shown in FIG. 3, the series connection of the second capacitor C2, the current detection circuit (CD) 21 and the second switching device Q2 is electrically connected in parallel to the secondary coil S of the transformer T1.

The second modified circuit configuration of the DC-DC converter 1C shown in FIG. 4 provides substantially the same effects and advantages as those of the DC-DC converter 1A shown in FIG. 1.

FOURTH EMBODIMENT

Figure 5:
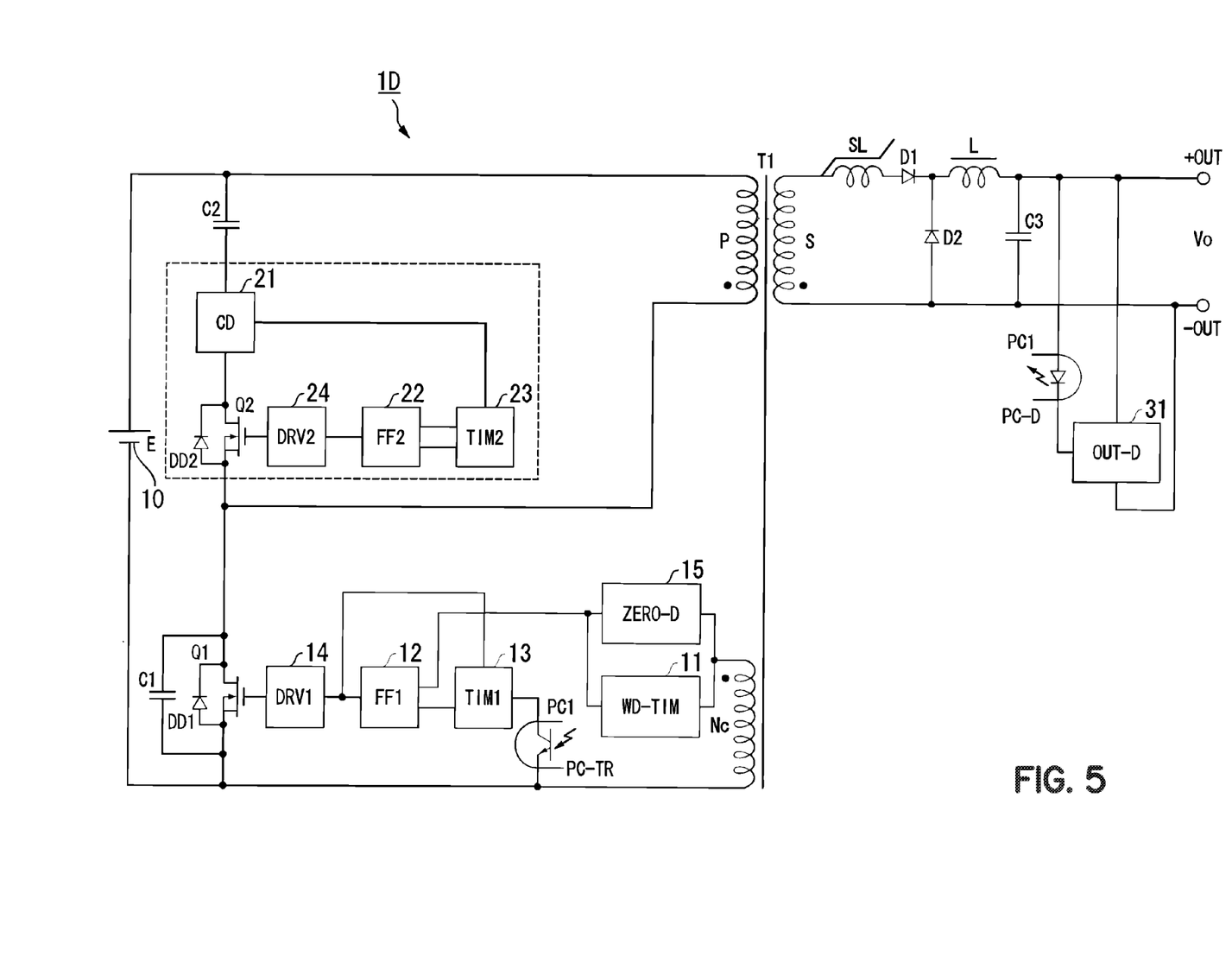
FIG. 5 is a circuit diagram illustrating a DC-DC converter in accordance with a fourth embodiment of the present invention.

FIG. 5 is a circuit diagram illustrating a DC-DC converter in accordance with a fourth embodiment of the present invention. A DC-DC converter 1D shown in FIG. 5 is different in circuit configuration from the above-described DC-DC converter 1A shown in FIG. 1. The following descriptions will focus on a difference between the DC-DC converter 1D shown in FIG. 5 and the above-described DC-DC converter 1A shown in FIG. 1.

In accordance with the above-described first embodiment, as shown in FIG. 1, the DC-DC converter 1A is a fly-back converter. In accordance with the fourth embodiment, as shown in FIG. 5, the DC-DC converter 1D shown in FIG. 5 is a forward converter. The DC-DC converter 1D shown in FIG. 5 has the following additional circuit elements that are not provided in the DC-DC converter 1A shown in FIG. 1. The secondary coil S of the transformer T1 of the DC-DC converter 1D shown in FIG. 5 has an inverted polarity from that of the secondary coil S of the transformer T1 of the DC-DC converter 1A shown in FIG 1. The DC-DC converter 1D shown in FIG. 5 includes a forward-rectifier circuit that includes a flywheel diode D2 and a smoothing inductance L. A series connection of the flywheel diode D2 and the smoothing inductance L is electrically connected between the first and second output terminals +OUT and −OUT.

The DC-DC converter 1D shown in FIG. 5 also includes a saturable reactor SL that is electrically connected in series to the secondary coil S of the transformer T1. A series connection of the saturable reactor SL, the rectifying diode D1 and the smoothing inductance L is electrically connected between the secondary coil S and the first output terminal +OUT. The saturable reactor SL promotes the voltage quasi resonance at the primary side P of the transformer T1, thereby allowing the first switching device Q1 to perform as a zero volt switch. Namely, the DC-DC converter 1D shown in FIG. 5 includes the output rectifying circuit of the forward type. In contrast, the DC-DC converter 1A shown in FIG. 1 includes the output rectifying circuit of the fly-back type. The DC-DC converter 1D shown in FIG. 5 is different in operations from the DC-DC converter 1A shown in FIG. 1, wherein the difference in operation is caused by the difference in circuit configuration of the output rectifying circuit. Operations of the DC-DC converter 1D shown in FIG. 5 are substantially the same as those of the DC-DC converter 1A shown in FIG. 1, except for the operations of the output rectifying circuit.

FIFTH EMBODIMENT

Figure 6:
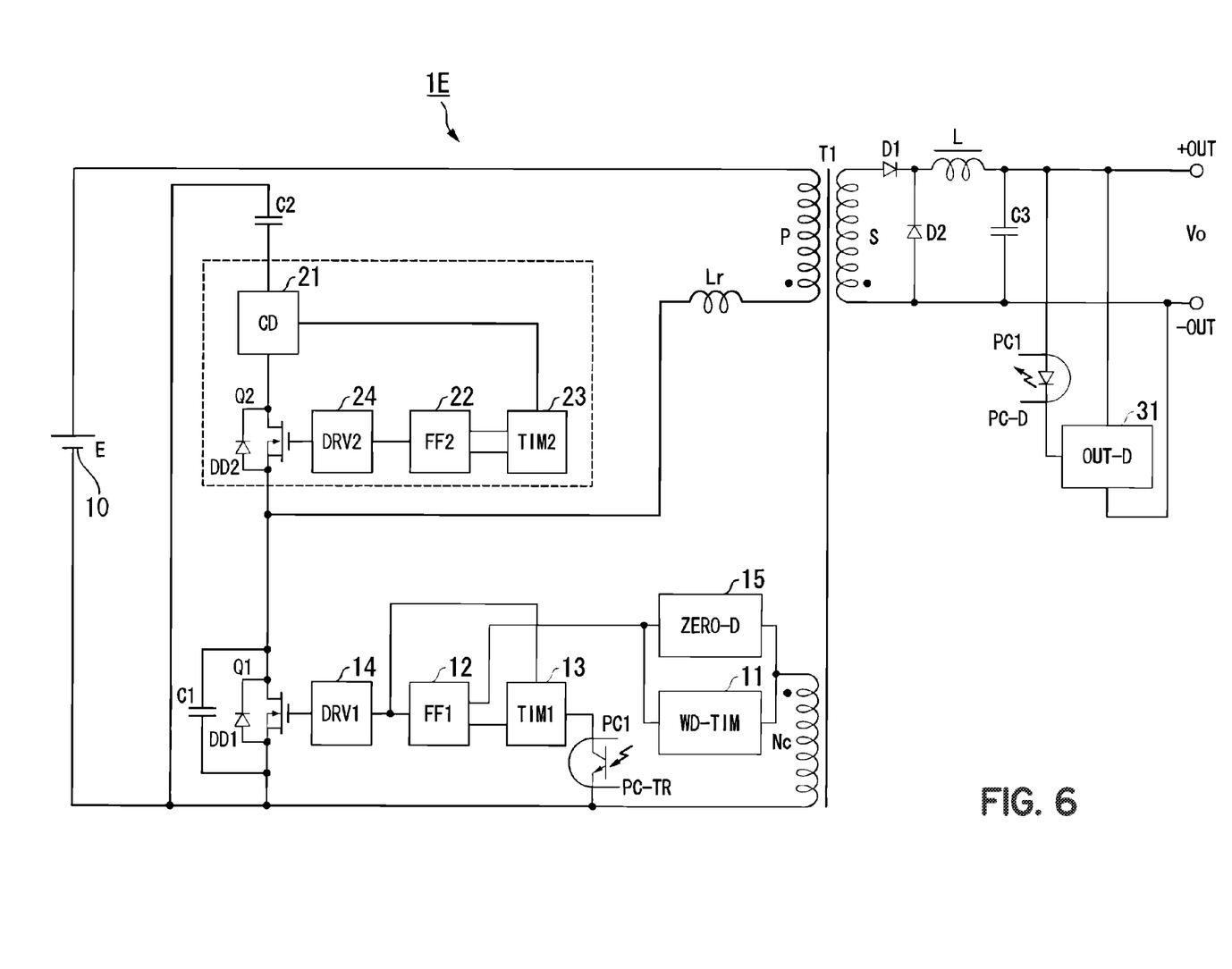
FIG. 6 is a circuit diagram illustrating a DC-DC converter in accordance with a fifth embodiment of the present invention.

FIG. 6 is a circuit diagram illustrating a DC-DC converter in accordance with a fifth embodiment of the present invention. A DC-DC converter 1E shown in FIG. 6 is different in circuit configuration from the above-described DC-DC converter 1B shown in FIG. 3. The following descriptions will focus on a difference between the DC-DC converter 1E shown in FIG. 6 and the above-described DC-DC converter 1B shown in FIG. 3.

In accordance with the above-described second embodiment, as shown in FIG. 3, the DC-DC converter 1B is a fly-back converter. In accordance with the fifth embodiment, as shown in FIG. 6, the DC-DC converter 1E shown in FIG. 6 is a forward converter. The DC-DC converter 1E shown in FIG. 6 has the following additional circuit elements that are not provided in the DC-DC converter 1B shown in FIG. 3.

The DC-DC converter 1E shown in FIG. 6 has an opposite polarity of the secondary coil S of the transformer T1 as compared to the DC-DC converter 1B shown in FIG. 3. The DC-DC converter 1E shown in FIG. 6 includes a forward rectifying circuit that includes a fly-wheel diode D2 and a smoothing inductance L. Instead of the saturable reactor SL shown in FIG. 5, the DC-DC converter 1E shown in FIG. 6 includes a leakage inductance Lr which is electrically connected in series to the primary coil P of the transformer T1. The leakage inductance Lr promotes the voltage quasi resonance in the primary side P of the transformer T1, thereby allowing the first switching device Q1 to perform as a zero volt switch. Namely, the DC-DC converter 1E shown in FIG. 6 includes the output rectifying circuit of the forward type. In contrast, the DC-DC converter 1B shown in FIG. 3 includes the output rectifying circuit of the fly-back type. The DC-DC converter 1E shown in FIG. 6 is different in operations from the DC-DC converter 1B shown in FIG. 3, wherein the difference in operation is caused by the difference in circuit configuration of the output rectifying circuit. Operations of the DC-DC converter 1E shown in FIG. 6 are substantially the same as those of the DC-DC converter 1B shown in FIG. 3, except for the operations of the output rectifying circuit.

The control circuit is configured to control the first switching device Q1 in the voltage mode control. It is also possible as a modification for the control circuit to be configured to control the first switching device Q1 in the current mode control.

The DC-DC converter 1A shown in FIG. 1 includes the voltage quasi resonant capacitor C1 that is electrically connected to both sides of the first switching device Q1. It is also possible as a modification for the voltage quasi resonant capacitor C1 to be electrically connected to both sides of the second switching device Q2. It is also possible as a further modification for the voltage quasi resonant capacitor C1 to be electrically connected to both sides of the rectifying diode D1. It is also possible as a still further modification for the voltage quasi resonant capacitor C1 to be electrically connected to both sides of a series connection of the rectifying diode D1 and the flywheel diode D2.

The leakage inductance Lr is integrated in the DC-DC converter. It is possible as a modification for the leakage inductance Lr to be separated from the DC-DC converter.

The DC-DC converter is configured to allow the switching device to perform as a zero volt switch that reduces the surge voltage and the noise, thereby reducing the noise of the DC-DC converter and improving the conversion efficiency. The second control circuit is configured to control the second switching device Q2 for the active clamp of the voltage quasi resonant converter, while the second control circuit is decoupled from the first switching device Q1. This circuit configuration allows the DC-DC converter to be free from the pulse transformer or the level shifter that is expensive. The circuit configuration allows using the voltage quasi resonant control circuit to control the first switching device as a main switch.

The DC-DC converter has reduced surge voltage and reduced noise. The DC-DC converter has improved conversion efficiency. The DC-DC converter is useful for the power equipment.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A DC-DC converter comprising:
   a DC power supply;
   a first switching device;
   a transformer further comprising a primary coil and a secondary coil, the primary coil being connected in series to the first switching device, the series connection of the primary coil and the first switching device being connected in parallel to the DC power supply;
   a capacitor;
   a second switching device being connected in series to the capacitor, the series connection of the second switching device and the capacitor being connected to both sides of the primary coil;
   a rectifying and smoothing circuit being connected to both sides of the secondary coil, the rectifying and smoothing circuit generating a DC output;
   a first control circuit connected to the first switching device, the first control circuit being configured to control the first switching device, the first control circuit being configured to control an ON-time of the first switching device; and
   a second control circuit connected to the second switching device, the second control circuit being configured to control the second switching device while the second control circuit being decoupled from the first control circuit, the first and second control circuits being configured to cause the first and second switching devices to alternately turn ON and OFF, the second control circuit being configured to cause the second switching device to turn ON synchronizing with a first time period between after a charge to the capacitor is started and until the charge to the capacitor is ended, the second control circuit being configured to cause the second switching device to turn OFF when a second time period previously set has been elapsed after the second switching device turned ON.

2. The DC-DC converter as claimed in claim 1, wherein the second control circuit is further configured to vary the second time period in proportional to a peak value of a charge current to the capacitor.

3. The DC-DC converter as claimed in claim 1, wherein the second control circuit is further configured to vary the second time period in proportional to a time duration of applying a charge current to the capacitor.

4. The DC-DC converter as claimed in claim 1, wherein the transformer further comprises an auxiliary coil, and the first control circuit is configured to detect a change in polarity of a voltage appearing at the auxiliary coil after the second switching device has turned OFF, and the first control circuit is configured to cause the first switching device to turn ON synchronizing with the detection of the change in polarity of the voltage.

5. A DC-DC converter comprising:
   a DC power supply;
   a transformer further comprising a primary coil, a secondary coil and an auxiliary coil;
   a first switching device connected between the DC power supply and the primary coil;
   a first fly-wheel diode connected in parallel to the first switching device;
   a first capacitor connected in parallel to the first switching device;

a second capacitor connected in series to the primary coil;

a second switching device connected in series to the second capacitor, the series connection of the second switching device and the second capacitor being connected between both sides of the primary coil;

a second fly-wheel diode connected in parallel to the second switching device;

a rectifying and smoothing circuit connected to both sides of the secondary coil, the rectifying and smoothing circuit generating a DC output;

a first control circuit connected to the first switching device, the first control circuit being configured to control the first switching device, the first control circuit being configured to control an ON-time of the first switching device; and a second control circuit connected to the second switching device, the second control circuit being configured to control the second switching device while the second control circuit being decoupled from the first control circuit, the first and second control circuits being configured to cause the first and second switching devices to alternately turn ON and OFF, the second control circuit being configured to cause the second switching device to turn ON synchronizing with a first time period between after a charge to the second capacitor through the second fly-wheel diode is started and until the charge to the second capacitor through the second fly-wheel diode is ended, the second control circuit being configured to cause the second switching device to turn OFF when a second time period previously set has been elapsed after the second switching device turned ON, the first control circuit being configured to detect a change in polarity of a voltage appearing at the auxiliary coil after the second switching device has turned OFF, the first control circuit being configured to cause the first switching device to turn ON synchronizing with the detection of the change in polarity of the voltage.

6. The DC-DC converter as claimed in claim 5, wherein the second control circuit is further configured to vary the second time period in proportional to a peak value of a charge current to the second capacitor.

7. The DC-DC converter as claimed in claim 5, wherein the second control circuit is further configured to vary the second time period in proportional to a time duration of applying a charge current to the second capacitor.

* * * * *